United States Patent [19]

Graham et al.

[11] Patent Number: 4,895,754

[45] Date of Patent: Jan. 23, 1990

[54] OIL TREATED MINERAL FILLER FOR ASPHALT

[75] Inventors: Joseph Graham, Plymouth, Minn.; Billy L. George, Hudson, Wis.

[73] Assignee: Minnesota Mining and Manufacturing Company, St. Paul, Minn.

[21] Appl. No.: 301,163

[22] Filed: Jan. 24, 1989

[51] Int. Cl.⁴ .............................................. D04H 1/58
[52] U.S. Cl. ................................ 428/289; 106/281.1; 106/282; 428/143; 428/280; 428/484
[58] Field of Search ........................... 106/281.1, 282; 428/280, 281, 289, 142, 489, 143, 141

[56] References Cited

U.S. PATENT DOCUMENTS 4,382,989   5/1983   Chang et al. ...................... 428/280

FOREIGN PATENT DOCUMENTS 0214853   10/1984   German Democratic Rep. .

OTHER PUBLICATIONS

Smith, D. J., "Density of Mineral Stabilizers in Asphalt Roofing Coatings", *Roofing Systems,* ASTM STP 603, American Society for Testing and Materials, 1976, pp. 57–103.

*Primary Examiner*—James J. Bell
*Attorney, Agent, or Firm*—Donald M. Sell; Walter N. Kirn; Douglas B. Little

[57] ABSTRACT

Use of surface modification treatment on mineral fines to obtain higher filler loadings in asphalt used for roofing shingles. Mineral fines are coated with oil such as a petroleum oil at about the 0.25–1.0 percent level before they are incorporated into molten asphalt. This treatment makes minerals which otherwise would be uncompetitive with traditional fillers, such as limestone, sufficiently compatible with asphalt to be a viable alternative to limestone. Nepheline syenite mineral fines treated in this manner have been successfully incorporated into asphalt for shingles at a loading of 65–70%.

8 Claims, No Drawings

OIL TREATED MINERAL FILLER FOR ASPHALT

TECHNICAL FIELD

This invention is in the field of particulate fillers for asphalt which is used in making roofing shingles.

BACKGROUND

Asphalt is a solid or semisolid cementitious material having as its main constituents bitumens which occur in nature or are obtained by refining petroleum. For years, asphalt coating compositions applied in the manufacture of roofing materials have contained mineral filler or stabilizer. This filler has been in powder form and has been included in the range of from 0 to 70 percent by weight of the total composition. Typical filler materials are: limestone, dolomite, nepheline syenite, or ground shale.

One type of mineral sold as a particulate filler is a rock filler having approximately the following composition:

|  | Weight Percent |
| --- | --- |
| $SiO_2$ | 50–75 |
| $Al_2O_3$ | 14–20 |
| $Fe_2O_3$ | 3–10 |
| $CaO$ | 1.5–12 |
| $MgO$ | 0.5–8 |
| $Na_2O$ | 2–7 |
| $K_2O$ | 0.3–7 |

This particulate is characterized by the following properties:

| Particle size - | <250 micrometers ($\mu$) |
| --- | --- |
| Mean particle size - | 40–150$\mu$ |
| Hardness - | 5–7 Mohs |
| Specific gravity - | 2.5–3.1 |

Although it is in good supply, the above-described particulate is not considered as good a filler as limestone because it does not wet-out as well in asphalt as limestone and cannot be mixed at as high a loading as limestone (e.g., 65–70 weight percent). A greater concentration of filler allows less of the much more expensive asphalt to be incorporated into the total composition.

The term wet-out means the affinity or compatibility of the filler for the asphalt. Poor wet-out is indicated by the following conditions occuring when the filler and asphalt are mixed: filler staying on top of the mixture; or filler agglomeration. Good wet-out is indicated by rapid wetting of particles by the fluid asphalt. A qualitative indication can be given by observing the rate at which filler is wetted out by molten asphalt during mixing.

Roofing granules having the same composition given above (which go on top of shingles) have been coated with oil to control dust.

There is a need for a treatment for the above-described filler particles to enhance their compatibility and thus their usefulness as asphalt filler. If the treatment could be economically applied and if the treated particles could be dispersed into asphalt with the same ease as limestone particles, they would be an economically attractive alternative to limestone.

DISCLOSURE OF INVENTION

A means has been invented for beneficiating mineral fillers (especially those just described in the Background section) yielding a marked improvement in wet-out in molten asphalt and a lowering of viscosity of molten asphalt-filler mixture. The invention can be summarized as a composition comprising asphalt and a treated inorganic rock particulate filler, having a particle size useful for asphalt coating compositions, the particles of said treated inorganic rock particulate being combined with an oil which is compatible with asphalt, not a vegetable oil, in a proportion of less than about 20 percent by weight oil in the treated filler.

It is preferred to use a proportion of oil to inorganic rock particulate which yields a treated particulate having at least the minimum flowability. Flowability is the capacity of a particulate to flow through material handling equipment such as chutes and bins. It is indicated by various tests such as angle of repose and slide angle. One useful test for flowability is a modification of ASTM method B329 which is a test for apparent density using an apparatus such as the Scott Paint Volumeter. To test for flowability, a tared sample is poured through the Volumeter with the screen removed from the upper funnel. The weight percent of sample passing through the Volumeter is determined and used as an indication of flowability. Minimum flowability is obtained when at least 90% of the tared sample passes through the Volumeter. Useful compositions comprise 0.1 to 1 percent by weight oil, preferably 0.25 to 1%, more preferably 0.5–1%.

Oils compatible with asphalt are characterized as: miscible with asphalt; oleophilic (organic loving) and not hydrophilic; and chemically inert, i.e., not chemically reacting with the asphalt to any substantial extent.

The addition of oil to the inorganic rock particulate appears to lower apparent viscosity of asphalt-filler mixtures made with the treated filler. Lower viscosity allows for faster mixing. Filler loadings of 60–70 weight percent in asphalt have been found practical using the rock filler described in the Background. The treated filler was comparable to limestone in wet-out and viscosity of a molten asphalt blend at about 190°–210° C. Viscosity at these conditions should be no more than 5000 centipoise (cps).

DETAILED DESCRIPTION

The inventive asphalt compositions are made by:

A. providing quantities of asphalt, inorganic rock particulate, and oil;

B. mixing the inorganic rock particulate (preferably less than 212 micrometer particle size) and the oil in such a way that the oil becomes incorporated into and/or onto the particles of the inorganic rock particulate using proportions such that the oil comprises about 0.25 to 1.00 weight percent of the resulting blend; and C. mixing the oil treated mineral particulate from step B with a quantity of the asphalt which has been made molten (e.g., at 210°–260° C.) in such proportion that the treated inorganic rock particulate comprises from greater than 0 to 75 (preferably 60–70, more preferably 65–70) weight percent of the resulting filled asphalt.

The oils for this invention preferably are characterized by the following properties: chiefly aromatic and or aliphatic with only minor concentrations of esters or hydroxy moieties; specific gravity 0.8–1.2; and viscosity 10–2,000 cps at 38° C. The oil found preferable in developing the process is petroleum or rock oil.

Step B is performed using equipment appropriate for blending solids and liquids. A food processor apparatus has been used for laboratory experiments, but a large scale mixer is preferred for commercial practicality. Two such mixers are the SandTurb and the Turbulizer mixers, from Bepex Corp. of Rolling Meadows, Ill., both of which comprise a high speed intensive mixer or impeller rotating within a housing.

Step B can be performed using inorganic rock particulate which has previously been heated (to for example 100°-200° C. in an oven or other heating device such as a fluid bed heater) and it can also be performed using ambient temperature filler.

Step C can take place in any apparatus suitable for blending molten asphalt with other ingredients, such as a stirred vessel.

Following step C, the filled asphalt can be used in the usual ways to make coated fabric mats and shingles. Asphalt shingles consist of a saturated mat coated with a filled asphalt which is covered with granules. The manufacture of asphalt coated fabric mats and shingles is well known to those skilled in the art. A typical shingle manufacturing process comprises the following steps:

(1) mixing molten asphalt and heated filler in a mixer;
(2) conveying a paper, felt or fiberglass mat or web through a coating apparatus which coats the mat with filled molten asphalt typically by means of coating rolls;
(3) dropping onto the hot asphalt surface of the coated mat a quantity of roofing granules sufficient to cover the mat;
(4) cooling the coated mat and applying a release agent such as talc or sand to the backside of the coated mat;
(5) applying a sealer to a portion of the mat;
(6) applying a release film or paper to the mat; and
(7) cutting the mat to form shingles.

The filler may be heated to a temperature substantially above room temperature before it is mixed with the asphalt. The purpose of the filler is to both reduce the cost of the shingle by reducing asphalt content and to improve performance of the asphalt shingle.

The invention will be further illustrated by the following examples which are intended to be purely exemplary. D. J. Smith, a consultant, has published a paper in *American Society for Testing and Materials*, "Density of Mineral Stabilizers in Asphalt Roofing Coatings", Roofing Materials, ASTM STP 603, 1976, pp. 57–103. This paper was used as a guide in preparing and testing samples of asphalt filled with mineral filler. Some of his test methods were modified because better testing equipment or procedures are now available.

Mineral particulates having compositions within the ranges stated in the Background section, for certain rock filler minerals, were treated with 0 to 1 percent slate oil to ascertain how the filler wets out in molten asphalt and how the oil treatment affects apparent viscosity of filled asphalt.

The filler designated F-1 and F-4 was a porphyritic rock taken from Corona, Calif., and its specific gravity was 2.67. Screen Analysis of the fillers used are indicated in the following Table:

TABLE 1

|       | F-1 Weight % | F-4 Weight % | F-6 Limestone Weight % |
|-------|--------------|--------------|------------------------|
| +212  | 0.2          | 6.7          | 0.2                    |
| 212–150 | 1.3        | 17.5         | 1.3                    |
| 150–75 | 13.1        | 26.3         | 13.1                   |
| 75–45 | 21.9         | 15.1         | 21.9                   |
| −45   | 65.5         | 34.5         | 65.5                   |

All studies were made using one source of asphalt, a standard coating asphalt in accordance with ASTM D-312-78. It is a steep Type 111 (111° C.) asphalt.

The limestone filler used for comparisons was a commercial mineral sold in the western United States as asphalt filler. It is available from Pleuss Stauffer Co., Lucerne, Calif. It is about 98% calcium carbonate. Its specific gravity is 2.68.

Viscosity was measured using a Brookfield Thermosel System for measuring at elevated temperature. The following test procedure was used:

(1) Spindle number 21 was used, and the sample cell and spindle were preheated to desired temperature.
(2) 13.0 g. of filled asphalt were added to the sample holder during which time the spindle was raised out of the holder. The hot spindle was lowered into the sample. The liquid level should intersect the spindle about 3 mm above the conical spindle body.
(3) Viscometer and thermo-container were aligned, and the insulating cap installed.
(4) Viscosity readings were taken after temperature equilibration. It is best to leave the viscometer spindle running because it provides agitation and reduces temperature gradients within the sample.
(5) Spindle speed is adjusted so that viscosity readings are in the 20–90 range.

Samples of inorganic rock filler treated with slate oil were prepared by adding specified amounts of oil to 100 g of mineral particulate contained in a food processor equipped with chopper blades. The mixture was blended for 30 seconds.

In larger scale tests, a model TC8 Turbulizer mixer was used to mix 0.5% slate oil with mineral particulate at about 1 kg/min.

Apparent viscosities of filled asphalt compositions containing 60 or 70 percent filler were determined over the temperature range usually encountered on roofing machines (190°-230° C.). The viscosity data is presented in Table 2 below.

TABLE 2

| Filler | Loading | Viscosity (Cps/100) | | | | | | |
|--------|---------|---------|---------|---------|---------|---------|---------|---------|
|        |         | 193° C. | 199° C. | 204° C. | 210° C. | 216° C. | 221° C. | 227° C. |
| F-1 | 70% |  | 940 | 670 | 450 | 360 | 270 | 200 |
| F-1 | 60% | 230 | 130 | 90 | 60 | 44 | 33 | 24 |
| F-1 0.5% oil | 70% |  | 660 | 470 | 350 | 260 | 200 | 150 |
| F-1 0.5% oil | 60% | 170 | 95 | 70 | 52 | 38 | 30 | 23 |
| F-4 | 70% | 720 | 500 | 370 | 290 | 220 | 180 | 130 |
| F-4 | 60% | 155 | 115 | 80 | 56 | 43 | 32 | 24 |
| F-4 0.5% oil | 70% | 640 | 400 | 300 | 195 | 155 | 108 | 84 |
| F-4 0.5% oil | 60% | 125 | 74 | 68 | 48 | 36 | 28 | 22 |
| F-4 1% oil | 70% | 460 | 300 | 220 | 160 | 120 | 90 | 68 |
| F-4 1% oil | 60% | 100 | 82 | 62 | 44 | 34 | 26 | 18 |
| F-6 | 70% | 610 | 450 | 325 | 245 | 190 | 150 | 115 |

TABLE 2-continued

| Filler | Loading | Viscosity (Cps/100) | | | | | | |
|---|---|---|---|---|---|---|---|---|
| | | 193° C. | 199° C. | 204° C. | 210° C. | 216° C. | 221° C. | 227° C. |
| F-6 | 60% | 150 | 88 | 62 | 44.5 | 35 | 27 | 20 |
| F-6 0.5% oil | 70% | 660 | 415 | 300 | 225 | 170 | 130 | 110 |
| F-6 0.5% oil | 60% | 140 | 94 | 68 | 46 | 31 | 24 | 18 |
| F-6 1% oil | 70% | 480 | 300 | 220 | 170 | 130 | 98 | 68 |
| F-6 1% oil | 60% | 130 | 88 | 60 | 40 | 30 | 23 | 17 |

Using the inorganic rock particulate treated with 0.5% oil, the inventive asphalt mixture was found to produce equivalent or lower viscosity than limestone filled asphalt at 60 and 70% filler loadings over most of the temperature range studied. At 1% oil treatment level, the viscosity of the mixture was 15,000 to 200 cps lower than limestone filled asphalt, depending on temperature. A coarser grade of mineral particulate is more desirable than the limestone grade tested.

Using a Turbilizer mixer, Corona mineral particulate was continuously mixed with slate oil at the 0.75% level at the rate of about 22,700 kg/hr. The treated inorganic rock particulate was incorporated into asphalt at the 68-70% level without experiencing problems with wet-out or viscosity which was too high. In similar tests run on filler without oil treatment, filler loadings had to be decreased to 62-63% to obtain good wet-out and viscosity.

Other embodiments of this invention will be apparent to those skilled in the art from a consideration of this specification or practice of the invention disclosed herein. Various omissions, modifications and changes to the principles described herein may be made by one skilled in the art without departing from the true scope and spirit of the invention which is indicated by the following claims.

What is claimed is:

1. A composition comprising asphalt and from greater than 0 to 75 weight percent of a treated inorganic rock particulate filler having a particle size useful in asphalt coating compositions, the particles of said treated inorganic rock particulate being combined with an oil, which is compatible with asphalt, in a proportion of less than about 20 percent by weight oil in the inorganic rock particulate.

2. The composition of claim 1 wherein the treated inorganic rock particulate is comprised of 0.1 to 1.0 weight percent oil.

3. The composition of claim 1 wherein the proportion of oil in the treated inorganic rock particulate yields a particulate which has at least minimum flowability.

4. The composition of claim 1 wherein the inorganic rock particulate comprises particles within the size range of about 45 to 250 micrometers.

5. The composition of claim 1 wherein the inorganic rock particulate is selected from minerals having the following composition:

| | Weight Percent |
|---|---|
| $SiO_2$ | 50–75 |
| $Al_2O_3$ | 14–20 |
| $Fe_2O_3$ | 3–10 |
| CaO | 1.5–12 |
| MgO | 0.5–8 |
| $Na_2O$ | 2.0–7 |
| $K_2O$ | 0.3–7 |

6. Fabric mat which is coated or impregnated with the composition of claim 1.

7. A shingle comprising the fabric mat of claim 6.

8. A method for making a filled asphalt blend comprising the steps of:
   A. providing quantities of the following raw materials: asphalt, inorganic rock particulate, and oil compatible with asphalt;
   B. mixing the inorganic rock particulate and the oil in such a way that the oil becomes coated onto the particles of the inorganic rock particulate using proportions such that the oil comprises less than 20 weight percent of the resulting blend; and
   C. mixing the oil treated inorganic rock particulate from step B with a quantity of the asphalt made molten in a proportion such that the filler comprises from greater than 0 to 75 weight percent of the resulting filled asphalt.

* * * * *